US007033673B2

(12) United States Patent
Wiedemann et al.

(10) Patent No.: US 7,033,673 B2
(45) Date of Patent: Apr. 25, 2006

(54) EROSION-RESISTANT SILICONE COATINGS FOR PROTECTION OF FLUID-HANDLING PARTS

(75) Inventors: Karl Erik Wiedemann, Seaford, VA (US); Rajagopalan Sivakumar, Yorktown, VA (US)

(73) Assignee: Analytical Services & Materials, Inc., Hampton, VA (US)

( * ) Notice: Subject to any disclaimer, the term of this patent is extended or adjusted under 35 U.S.C. 154(b) by 280 days.

(21) Appl. No.: 10/626,556

(22) Filed: Jul. 25, 2003

(65) Prior Publication Data

US 2005/0019589 A1    Jan. 27, 2005

(51) Int. Cl.
*B32B 15/04* (2006.01)
(52) U.S. Cl. .................................. 428/447; 428/450
(58) Field of Classification Search ................ 427/387, 427/388.1, 388.2; 428/446, 447, 450
See application file for complete search history.

(56) References Cited

U.S. PATENT DOCUMENTS

| 3,635,887 | A |   | 1/1972  | Polmanteer |
| 3,677,178 | A |   | 7/1972  | Gipe |
| 3,729,438 | A |   | 4/1973  | Plesich et al. |
| 3,814,716 | A |   | 6/1974  | Kowalski et al. |
| 3,865,588 | A |   | 2/1975  | Ohto et al. |
| 3,894,873 | A |   | 7/1975  | Kobayashi et al. |
| 3,909,265 | A |   | 9/1975  | Miyano et al. |
| 3,949,142 | A |   | 4/1976  | Doggett |
| 3,953,212 | A |   | 4/1976  | Miyano et al. |
| 4,358,522 | A |   | 11/1982 | Fujita et al. |
| 4,433,007 | A |   | 2/1984  | Marwitz et al. |
| 4,434,283 | A | * | 2/1984  | Sattlegger et al. ............ 528/34 |
| 4,435,476 | A |   | 3/1984  | Phillips et al. |
| 4,439,557 | A |   | 3/1984  | Kawamura et al. |
| 4,503,126 | A |   | 3/1985  | Phillips et al. |
| 4,508,888 | A | * | 4/1985  | Letoffe et al. ................ 528/23 |
| 4,515,932 | A |   | 5/1985  | Chung |
| 4,532,315 | A | * | 7/1985  | Letoffe et al. ................ 528/14 |
| 4,535,109 | A |   | 8/1985  | Kondo et al. |
| 4,568,629 | A |   | 2/1986  | Kinashi et al. |
| 4,604,444 | A | * | 8/1986  | Donnadieu et al. ........... 528/34 |
| 4,701,380 | A |   | 10/1987 | Narula et al. |
| 4,842,988 | A |   | 6/1989  | Herrmann et al. |
| 4,842,990 | A |   | 6/1989  | Herrmann et al. |
| 4,911,864 | A |   | 3/1990  | Sato et al. |
| 4,978,702 | A |   | 12/1990 | Yuyama et al. |
| 5,051,311 | A |   | 9/1991  | Popa et al. |
| 5,118,758 | A |   | 6/1992  | Graiver et al. |
| 5,145,907 | A |   | 9/1992  | Kalinowski et al. |
| 5,204,143 | A |   | 4/1993  | Nishimiya et al. |
| 5,246,995 | A |   | 9/1993  | Murakami et al. |
| 5,258,063 | A |   | 11/1993 | Cifuentes et al. |
| 5,373,079 | A |   | 12/1994 | Altes |
| 5,424,354 | A |   | 6/1995  | Takeoka |
| 5,502,144 | A |   | 3/1996  | Kuo et al. |
| 5,516,812 | A |   | 5/1996  | Chu et al. |
| 5,561,184 | A | * | 10/1996 | Miyoshi et al. ............. 524/425 |
| 5,679,725 | A |   | 10/1997 | Fisher |
| 5,710,475 | A | * | 1/1998  | Irwin et al. ................ 310/254 |
| 5,731,059 | A |   | 3/1998  | Smith et al. |
| 5,811,210 | A |   | 9/1998  | Kawamura et al. |
| 5,908,878 | A | * | 6/1999  | Baity et al. ................. 523/203 |
| 5,932,650 | A |   | 8/1999  | Bayly |
| 5,990,231 | A |   | 11/1999 | DeGroot et al. |
| 6,162,756 | A |   | 12/2000 | Friebe et al. |
| 6,165,620 | A | * | 12/2000 | Harblin et al. ............. 428/450 |
| 6,177,138 | B1 |   | 1/2001  | Sawaragi et al. |
| 6,204,350 | B1 |   | 3/2001  | Liu et al. |
| 6,284,860 | B1 |   | 9/2001  | Sommer et al. |
| 6,413,354 | B1 |   | 7/2002  | Haas et al. |
| 6,444,740 | B1 |   | 9/2002  | DeCato et al. |
| 6,497,964 | B1 |   | 12/2002 | Matsumura et al. |
| 6,514,574 | B1 |   | 2/2003  | Valeri et al. |
| 6,706,405 | B1 |   | 3/2004  | Sanders et al. |
| 2002/0010251 | A1 |   | 1/2002  | Muramatsu et al. |

FOREIGN PATENT DOCUMENTS

| EP | 0 242 899 A2 |   | 10/1987 |
| EP | 0 242 899 A3 |   | 10/1987 |
| EP | 0 572 148 A2 |   | 12/1993 |
| EP | 0 572 148 A3 |   | 12/1993 |
| EP | 1008613      | * | 6/2000  |
| EP | 1 046 689 A1 |   | 10/2000 |
| EP | 1046689      | * | 10/2000 |
| WO | WO 98/39391  | * | 9/1998  |
| WO | WO 99/67336  | * | 12/1999 |
| WO | WO 00/05308 A1 |  | 2/2000  |

OTHER PUBLICATIONS

"Silicones and Sol-gel Chemistry," University of Rochester (2003), http://www.che.rochester.edu:8080/Courses/CHE286/silicones.htm.
"Cytec>> Coating Chemicals," Cytec Industries Inc. (2003), http://www.cytec.com/business/SpecialtyChemicals/cymelpop.htm.
"Overview: Fumed Metal Oxides," Cabot Corp. (2003), http://w1.cabot-corp.com/controller.jsp?N=23+4294967082+1001 & entry+product.
"Introduction," Illinois State University (2003), http://www.che.ilstu.edu/-standard/ECCC8/intro.html.
"Dow Corning(R) 3-0134 Polymer," Dow Corning Corp. (2003), http://www.dowcorning.com/applications/product_finder/pf_details.asp?I1=004&pg=00001107&prod=04019371&type=MATL.
"Aerocoat K," Analytical Services & Materials, Inc. (2003), http://www.asm-usa.com/coatings/index.html.

(Continued)

Primary Examiner—Erma Cameron
(74) Attorney, Agent, or Firm—Joy L. Bryant

(57) ABSTRACT

Novel uses of compositions of silanol and trifunctional silanes include their application and cure to form erosion-resistant silicone coatings on fluid-handling parts. Methods of application, maintenance, and repair of these coatings are also described.

12 Claims, No Drawings

OTHER PUBLICATIONS

"Coating of Rain Erosion Test Articles," Karl E. Wiedemann, Analytical Services & Materials, Inc., (2002).

"One Part Silicone Sealants," Dale Flackett, FlackTek, Inc., http:/www.gelest.com/Library/library (2003).

"The effect of a foul release coating on propeller performance" M. Atlar et al., ENSUS 2002: International Conference on Marine Science and Technology for Environment Sustainability, Newcastle, United Kingdom, Dec. 2002.

"Calculation of the Effects of New Generation Coatings on High Speed Propellar Performance," M. Atlar et al., IInd International Warship Cathodic Protection Symposium and Equipment Exhibition, Shrivenham, United Kingdom, Feb. 2003.

"Intersleek 700," International Marine Coatings (2003), http:/www.intersleek700.com/main.asp.

"EPON* Resin: Epoxy Bisphenol F (BPF) Resin 862," Resolution Performance Products, LLC (2003), http:www.resins.com/resins/am/product_html/SC_772.html.

* cited by examiner

EROSION-RESISTANT SILICONE COATINGS FOR PROTECTION OF FLUID-HANDLING PARTS

BACKGROUND OF THE INVENTION

1. Field of the Invention

The invention on which this application for patent is based encompasses the use of erosion-resistant silicone coatings for the protection of fluid-handling parts from erosion by impacting particles, impingement, and cavitation. The invention further encompasses methods of application, maintenance, and repair of these coatings.

2. Description of Related Art

Substrates such as the surfaces and interiors of machine or structural parts, often require protection against wear. A material which is selected for, say its resistance to breakage by brittle fracture may not have adequate resistance to one or more kinds of wear. A coating can then be applied to the exterior of the part, in order to protect the material forming the bulk of the part from the effects of wear.

A machine or structural part may suffer wear when it is continuously rubbed against another surface at high speeds. For example, a machine tool bit may be worn down through prolonged use. To reduce such wear, the bit is often coated with a hard material.

The high-speed impact of particles can also induce wear; this process of wear is a form of erosion. The erosion of rock by blown sand is well known. In this application for patent, the term erosion is used to refer to the wearing of a part by particle impact, impingement, or cavitation. For certain fluid-handling parts, the primary function of solid material which makes up certain regions of the part can be to occupy volume in order to either efficiently move the fluid or to efficiently convert movement of the fluid to another form of energy. Modification of the dimensions of a part or loss of the material of which a part is formed through erosion caused by particle impact, impingement, or cavitation affects the efficiency of moving a fluid or converting fluid motion to another form of energy. It is desirable to prevent the loss of material from or alteration of dimensions of a fluid-handling part so that the original shape, volume, and contours of the part are most nearly preserved.

Sheathing a fluid-handling part with a hard surface may not provide adequate or appropriate protection against erosion by high-speed particle impact. For example, a common problem with helicopter operation is erosion of rotors by impacting particles such as dirt, sand grains, and water droplets. This erosion may require the frequent replacement of expensive rotors, compromise aerodynamic performance, and in some cases lead to catastrophic failure of the rotor during helicopter operation. The problem of rotor erosion is of special concern to the military: operation in arid or desert environments may result in erosion at a rapid rate and the exigencies and uncertainties associated with combat may preclude regular maintenance. Presently, several approaches, none of which are fully satisfactory, are taken to protect helicopter rotors. In one approach, metal strips are fastened to the leading edge of the rotors. Metal strips are rigid and therefore compromise the aerodynamic performance of composite rotors which are designed to flex in several modes; the metal strips may place extra mechanical stress on the rotors, for example, by constraining their flexing. The metal strips can initiate small cracks in the composite material of the rotor; these cracks can then grow, resulting in catastrophic failure. Because of the problem of crack initiation, frequent, expensive inspection is required. Furthermore, the metal strips are rapidly damaged by impacting particles. Hard, brittle metal strips tend to have material chipped off by the particles and softer metal strips tend to suffer deformation.

Attempts to protect helicopter rotors have also included the use of polyurethane tape applied to the leading edge of rotors. Because the tape is flexible, it has the advantage over the metallic strips of not impeding the flexing of a composite rotor. However, the tape can trap sand beneath it, which can compromise the mass balance of rotors on opposite sides of the drive shaft and affect performance. Furthermore, the tape is rapidly abraded by impacting sand and rain droplets and requires frequent replacement. Finally, under harsh conditions, the adhesive which affixes the tape to the rotor can fail.

Hydroelectric turbines and turbine blades or buckets can be eroded by impacting silt particles. Impingement, associated with bubbles entrained in a liquid contacting a surface at a high speed, can also erode hydroelectric turbines and turbine blades or buckets. Cavitation next to the surface of turbine blades or buckets can erode the surface of the turbine blade or bucket. In the past, the problem of impacting particles, impingement, and cavitation eroding fluid-handling parts exposed to a liquid, such as water, has been sought to be mitigated by the use of hard coatings, such as plasma-sprayed tungsten carbide. Although such coatings provide some protection to the fluid-handling part for a period of time, they are expensive and, on the whole, not very effective. For example, such hard coatings can transmit vibration associated with cavitation to the fluid handling part so that the fluid handling part is degraded.

When fluid-handling parts cannot be adequately protected from the effects of particle impact, impingement, or cavitation, the maintenance of these fluid-handling parts generally takes the form of replacement or repair of a worn part. However, the need for frequent replacement or repair has high associated labor and material costs. In certain applications, replacement may not be possible, e.g., it may not be possible to replace a helicopter rotor during a military operation. Repair of a composite rotor may be impractical. Repair of metal fluid-handling parts, such as turbine blades and buckets in hydroelectric turbines, may be possible but undesirable. For example, material used in welding can be different than the material from which the bulk of a fluid-handling part is formed and thus compromise the strength of the fluid-handling part or affect the structural properties in an undesirable way. It would be preferable if particle impact, impingement, and cavitation affected a coating which did not contribute to the strength of a fluid-handling part or substantially affect its structural properties so that the loss of or need to repair or replace the coating did not detrimentally affect the fluid-handling part.

The inadequate polyurethane tape is an example of a polymer coating. Certain other polymer coatings, such as polyurethane, provide some protection, but on the whole are impractical because of poor adhesion to fluid-handling parts and sensitivity to environmental factors such as hydrolytic degradation.

By contrast, silicone polymers have properties which can be advantageous in protecting fluid-handling parts. For example, silicone polymers are resistant to degradation by ultraviolet radiation, which is a positive characteristic for a material envisioned for coating helicopter rotors, which may be directly exposed to the sun for extended periods of time. Silicone polymers are not degraded by water, which allows them to be used for coating hydroelectric turbines. However, flexible silicone polymer coatings are infrequently used in applications where they must withstand severe mechanical stress, such as imposed by high-velocity impacting particles, in protecting machine or structural parts.

The prior art discloses the use of silicone coatings to protect polymer substrates from abrasion and weathering. However, the use of coatings to protect substrates against the effects of particle impact, impingement, and cavitation is not disclosed. The use of silicone coatings to protect metal substrates from electrochemical corrosion is disclosed in the prior art; however, the protection of metal substrates against the effects of particle impact, impingement, and cavitation is not disclosed. Other prior art discloses the use of coatings in delaying the onset of cavitation and absorbing vibration generated by cavitation, but the coatings themselves are not described as being resistant to erosion by particle impact, impingement, and cavitation, in the way taught by the present application.

There thus remains an unmet need for a method for using a silicone coating to effectively shield a fluid-handling part from erosion by impacting particles, impingement, and cavitation, the method being inexpensive and easy, and the coating providing protection for a prolonged period of time.

SUMMARY OF THE INVENTION

It is therefore the object of the present invention to provide a method for using a silicone coating to effectively shield a fluid-handling part from erosion by impacting particles, impingement, and cavitation, the method being inexpensive and easy, the coating providing protection for a prolonged period of time, and the coating being mechanically compatible with the fluid-handling part.

A method according to the present invention for coating a fluid-handling part with an erosion-resistant coating includes the following. A coating composition that includes a trifunctional silane, a silanol fluid, and a filler is provided. The coating composition is applied to and cured on a fluid-handling part to form the erosion-resistant coating that provides the fluid-handling part with protection against erosion by particle impact, impingement, and cavitation.

One aspect of the invention is a method for using an erosion-resistant coating to provide protection against erosion by particle impact, cavitation, and impingement for a fluid-handling part. Fluid-handling parts which can be coated include a tank, a pipe, a duct, a channel, a guide, an intake manifold, an aperture, a nozzle, a valve, a gate, a spear valve, a spear tip, a turbine, a tide mill, a compressor, a pump, a windmill, a blower, a hydroelectric turbine, an impeller, a propeller, a fan, a runner, a rotor, a bucket, a blade, a vane, a helicopter rotor, a turbine blade, a runner blade, a control surface, a wing, a flap, a jet deflector, a fairing, a fuselage, a dome, a housing, a hub, a shaft, a penstock, a spiral case, a strainer and a draft tube.

The coating composition can be applied to and cured on a material forming a surface of the fluid-handling part such as metal, ceramic, and polymer. For example, the material can be a steel alloy, a stainless steel alloy, an aluminum alloy, a nickel alloy, a titanium alloy, a lead alloy, a urethane, an epoxy, a polycarbonate, an acrylic, a polyester composite, or an epoxy composite.

Another aspect of the invention is an erosion-resistant fluid-handling part, which includes a coating composition cured onto a surface of the fluid-handling part. For example, the fluid-handling part includes a hydroelectric turbine with a steel alloy or stainless steel alloy surface.

Another aspect of the invention is a method for maintaining protection of a fluid-handling part against erosion by particle impact, cavitation, or impingement, which includes stripping an existing erosion-resistant coating from the fluid-handling part, providing a coating composition, applying the coating composition to the fluid-handling part, and curing the coating composition on the fluid-handling part. Stripping includes using a focused water jet to cut through and remove the existing erosion-resistant coating.

Another aspect of the invention is a method for repairing an erosion-resistant coating on a fluid-handling part, which includes preparing a surface of a damaged area by cleaning the surface of all foreign matter, providing a coating composition, applying the coating composition to the surface of the damaged area, and curing the coating composition on the fluid-handling part.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other compounds can be prepared and other methods developed without parting from the spirit and scope of the invention.

The coating formed from the composition is useful in protecting the fluid-handling part from degradation by the surrounding environment. For example, the coating protects the fluid-handling part from erosion caused by particle impact, impingement, or cavitation. Erosion by particle impact is caused by particles entrained in the moving fluid, which can be either a gas or a liquid. Impingement is an accelerated form of corrosion associated with bubbles entrained in the moving fluid. Cavitation occurs in incompressible fluids, such as water; cavitation involves the sudden collapse of bubbles which have been produced by the boiling of the fluid at a low pressure. The formation and collapse of a single such bubble can be termed a cavitation event. More than one of the mechanisms of particle impact, impingement, and cavitation can simultaneously act on a fluid-handling part. For example, particle impact can affect the leading edge of a hydroelectric turbine blade while cavitation affects the suction side of the blade.

In this application for patent, the term "erosion-resistant" is used to refer to resistance to erosion induced by impacting particles, impingement, and cavitation. The erosion-resistant coatings are also resistant to degradation by environmental factors including water, extreme temperature, and sunlight. The method of forming a coating in accordance with the invention is simple and inexpensive.

One aspect of the invention is a method for coating a fluid-handling part with an erosion-resistant coating. The coating composition used to form the erosion-resistant coating includes a trifunctional silane, a silanol fluid, and a filler. The coating composition is applied to and cured on the fluid-handling part to form the erosion-resistant coating.

The trifunctional silane of the coating composition can be an acetoxy silane, a ketoximino silane, an enoxy silane, an amine silane, an alkoxy silane, or an alkenyl silane. In one embodiment the trifunctional silane can be ethyl triacetoxysilane or vinyl triacetoxysilane. In another embodiment, the trifunctional silane can be methyl tris (methyl-ethyl-ketoximino) silane or vinyl tris (methyl-ethyl-ketoximino) silane.

In a preferred embodiment, the silanol fluid is a polydialkylated siloxane, such as polydimethylsiloxane. For example, the silanol fluid can be a hydroxyl-terminated polydimethylsiloxane. In one embodiment, the silanol fluid of the coating composition has a kinematic viscosity of from about 100 centistokes to about 130,000 centistokes. For a silanol fluid with linear chains and a unimodal molecular weight distribution, this is believed to correspond to a range of weight average molecular weight, Mw, of from approximately 4000 g/mol to approximately 150,000 g/mol and a range of hydroxyl content from approximately 0.8 wt. % to approximately 0.02 wt %. In another embodiment, the silanol fluid has a kinematic viscosity of from about 700 centistokes to about 130,000 centistokes; with the assumption of linear chains and a unimodal distribution, a viscosity of 700 centistokes corresponds to Mw~18,000 g/mol and a hydroxyl content of approximately 0.2 wt. %. In another embodiment, the silanol fluid has a kinematic viscosity of from about 2000 centistokes to about 130,000 centistokes; with the assumption of linear chains and a unimodal distribution, a viscosity of 2000 centistokes corresponds to Mw~35,000 g/mol and a hydroxyl content of approximately 0.09 wt. %. In another embodiment, the silanol fluid has a kinematic viscosity of from about 40,000 centistokes to about 130,000 centistokes; with the assumption of linear chains and a unimodal distribution, a viscosity of 40,000 centistokes corresponds to Mw ~85,000 g/mol and a hydroxyl content of approximately 0.04 wt. %.

Examples of fillers include fumed silica and reinforcing agents such as glass fiber, mica, wollastonite, kaolin, and other phylosilicates. If fumed silica is used, it can be treated with an agent before addition to the rest of the coating composition. Examples of useful silica treatment agents are hexamethylenedisilazane, divinyltetramethylenedisilazane, chlorosilane, and polydimethylsiloxane. It can be advantageous to use a filler in which the particles have high aspect ratio. For example, if mica is used as a filler, mica platelets having a high square root of area to thickness ratio can be used. Similarly, if glass fibers are used, it can be advantageous to use fibers with a high length to diameter ratio. In one embodiment, more than one type of filler is included in the composition, for example, both fumed silica and mica are added to the composition.

In another embodiment, a catalyst is included in the coating composition in order to speed the curing reaction. A number of different catalysts can be used, for example, a tin catalyst can be used. An example of a useful tin catalyst is dibutyl tin dilaurate.

In another embodiment, a pigment agent is included in the composition. In various embodiments, a pigment agent improves the aesthetic appearance of the coated fluid-handling part, provides camouflage, or protects the fluid-handling part from visible or ultraviolet light. In another embodiment, a solvent, e.g., xylene or mineral spirits, is included in the coating composition. In various embodiments, the solvent serves the function of adjusting the viscosity of the composition in order to facilitate mixing or application of the composition to a fluid-handling part. For example, inclusion of a solvent in the formulation facilitates application of the composition by spraying.

It has been found that soft or low modulus coatings tend to be more effective in protecting a fluid-handling part against erosion by particle impact, impingement, or cavitation than hard or high-modulus coatings. In keeping with this observation, specific embodiments of the present invention are selected to form compositions tailored for specific uses. For example, the hardness of the coating formed is increased by decreasing the fraction of silanol fluid or increasing the fraction of filler in the composition. As another example, the viscosity of a coating composition is increased by decreasing the fraction of solvent in the composition. A high viscosity composition is sometimes more useful if, for example, the composition is manually applied by spreading, whereas a low viscosity composition is sometimes more useful if, for example, the composition of the present invention is sprayed onto the fluid-handling part.

The coating composition includes the components with fraction ranges shown in Table 1, for which the fraction ranges are computed on the basis of all the non-solvent components of the composition.

TABLE 1

| Component | Fraction Range |
|---|---|
| Trifunctional silane | about 0.01 to about 20 wt. % |
| Silanol fluid | about 40 to about 99 wt. % |
| Fumed silica | about 0.01 to about 25 wt. % |

Optionally, the coating composition also includes the components with fraction ranges shown in Table 2.

TABLE 2

| Component | Fraction Range |
|---|---|
| Catalyst | about 0.01 to about 5 wt. % |
| Pigment | about 0.01 to about 10 wt. % |

In one embodiment, from about 10 parts to about 300 parts by weight of xylene are added to 100 parts by weight of the non-solvent components to produce a solvent-inclusive composition envisioned, for example, for application by spraying. In a specific embodiment, 108 parts by weight of xylene are added to 100 parts by weight of the non-solvent components to produce a solvent-inclusive composition. The optimal ratio of solvent to non-solvent components for a given application technique, e.g., spraying, and for a given use is determined by trial and error. A good ratio for a first trial in a trial and error approach is 110 parts by weight of xylene per 100 parts by weight of the non-solvent components.

In more particular embodiments, the present compositions includes fractions of components in the ranges shown in Table 3.

TABLE 3

| Component | Fraction Range |
|---|---|
| Trifunctional silane | about 1.5 to about 10 wt. % |
| Silanol fluid | about 60 to about 95 wt. % |
| Fumed silica | about 3 to about 13 wt. % |

In one embodiment, the trifunctional silane is an acetoxy silane or a ketoximino silane.

Optionally, the compositions of Table 3 also include catalyst and pigment components in the fraction ranges shown in Table 4.

TABLE 4

| Component | Fraction Range |
|---|---|
| Catalyst | about 0.02 to about 1 wt. % |
| Pigment | about 0.02 to about 5 wt. % |

In one embodiment, from about 20 parts to about 200 parts by weight of xylene are added to 100 parts by weight of the non-solvent components to produce a solvent-inclusive composition.

Exemplary compositions of the present invention include fractions of components in the ranges shown in Table 5.

TABLE 5

| Component | Fraction Range |
| --- | --- |
| Trifunctional silane | about 2 to about 7 wt. % |
| Silanol fluid | about 85 to about 92 wt. % |
| Fumed silica | about 5 to about 10 wt. % |

In one embodiment, the trifunctional silane is an acetoxy silane or a ketoximino silane.

Optionally, the exemplary compositions of Table 5 also include the components with fraction ranges shown in Table 6.

TABLE 6

| Component | Fraction Range |
| --- | --- |
| Catalyst | about 0.04 to about 0.4 wt. % |
| Pigment | about 0.03 to about 1 wt. % |

In one embodiment, from about 60 parts to about 130 parts by weight of xylene are added to 100 parts by weight of the non-solvent components to produce a solvent-inclusive composition.

Exemplary compositions include fractions of components in the ranges shown in Table 7.

TABLE 7

| Component | Fraction Range |
| --- | --- |
| Trifunctional silane | about 2 to about 7 wt. % |
| Silanol fluid | about 85 to about 92 wt. % |
| Fumed silica | about 5 to about 10 wt. % |

In one embodiment, the trifunctional silane is ethyl triacetoxysilane, vinyl triacetoxysilane, methyl tris (methyl-ethyl-ketoximino) silane, or vinyl tris (methyl-ethyl-ketoximino) silane.

The range of molar ratios of trifunctional silane to silanol and of fumed silica to silanol in one embodiment is presented in Table 8. In determining these molar ratios, the molecular weight of the fumed silica is taken to be the same as that of silicon dioxide.

TABLE 8

| Components | Range of Molar Ratios |
| --- | --- |
| Trifunctional silane:Silanol | about 5:1 to about 1000:1 |
| Fumed silica:Silanol | about 10:1 to about 1000:1 |

Exemplary embodiments have components in the range of molar ratios as presented in Table 9.

TABLE 9

| Components | Range of Molar Ratios |
| --- | --- |
| Trifunctional silane:Silanol | about 20:1 to about 300:1 |
| Fumed silica:Silanol | about 100:1 to about 300:1 |

The components of the coating composition are preferably mixed until the composition is homogeneous. In one embodiment, a period of two days after mixing is allowed before applying the coating composition to a fluid handling part.

Silicone materials are not very strong relative to many other polymer, ceramic, and metal materials, but it has been found that the silicone coatings encompassed by the invention are very resistant to erosion by particle impact and by cavitation and are very effective in protecting fluid-handling parts from erosion by particle impact and cavitation. The erosion resistance and erosion protection provided is superior to many materials used in fluid-handling parts, for example, steel, aluminum, tungsten carbide, and nickel as demonstrated by the results presented in Table 13, below. The coatings are useful for providing protection against the effects of impingement and the effects of impacting liquid particles, e.g., rain droplets.

The prior art teaches the production of crosslinked siloxane materials from silanols and multifunctional silanes. However, the prior art does not teach the use of such materials having resilient mechanical properties as coatings to protect fluid-handling parts against erosion by particle impact, impingement, and cavitation. As described in this application for patent, silanol chains crosslinked by trifunctional silanes result in coatings which unexpectedly have excellent properties, including erosion resistance and long operating life when used to protect a fluid handling part from the effects of particle impact, impingement, and cavitation.

Without being bound by theory, one hypothesis is that a coating formed according to the present invention protects a substrate from erosion and cracking by mechanisms similar to the following. The coating dissipates vibrational energy associated with cavitation on or near to the coated substrate as thermal energy. Therefore, the vibrational energy does not reach the substrate and cannot induce the formation of microcracks which may eventually result in catastrophic failure in the substrate. The coating also dissipates kinetic energy associated with the impact of a particle on the surface of the coating as thermal energy, and thereby stops the particle before it reaches the substrate so that the impacting particle cannot erode, chip, or deform the substrate. Because the coating absorbs vibrational as well as kinetic energy, minimal secondary vibrations are induced in the coating by an impacting particle, and secondary vibrations are not transmitted to the substrate. Furthermore, the coating is flexible, and thus does not impede the flexing of a fluid-handling part, e.g., a composite helicopter rotor, or impose additional mechanical stresses on a fluid-handling part which does flex.

The coating's protection of a substrate, long operating life, and flexibility are believed to be promoted by the viscoelastic nature of the coating. The viscous nature of the coating helps dissipate kinetic and vibrational energy as thermal energy. The elastic nature of the coating allows the coating to be only temporarily deformed by an impacting particle and return to its original shape within a short time.

In one view, the viscoelastic nature of the coating arises from the molecular structure of the coating. A silanol fluid can be a hydroxyl-terminated polydialkyl siloxane, for example, polydimethylsiloxane chains terminated at the ends with hydroxyl groups (PDMS-OH). When not subjected to stress, a silanol chain can be in a random coil configuration. When subjected to stress, the chain extends, but returns to its random coil configuration when the stress is relieved.

One hypothesis holds that the trifunctional silanes function as crosslinking agents; more specifically, the trifunctional silanes react with hydroxyl groups on components of the coating composition to form covalent bonds. When the total number of trifunctional silanes is in excess of the total number of hydroxyl groups on the components of the coating composition, all hydroxyl groups are replaced by functional groups from the trifunctional silanes. For example, a trifunctional silane can react with hydroxyl groups on the silanol chains. After a silanol chain has reacted with trifunctional silane, it is referred to as a functionalized siloxane chain. For example, a triacetoxylated silane can react with a hydroxyl group on a silanol chain to displace the hydroxyl group, release acetic acid, and bond to form a siloxane chain with an additional silicon atom and two acetoxy groups at the site were the hydroxyl group was previously located. When hydroxyl-terminated silanol chains are used, acetoxy-terminated siloxane chains are formed. The trifunctional silanes can also react with hydroxyl groups on other components of the coating composition, for example, hydroxyl groups on a filler and hydroxyl groups on a pigment, to form functionalized components.

According to this hypothesis, when the total number of trifunctional silanes is in excess of the total number of hydroxyl groups on the components of the coating composition, such that all hydroxyl groups are replaced by functional groups from the trifunctional silanes, e.g., acetoxy groups, and no water is present, essentially no further reactions among the functionalized siloxane chains, other functionalized components, for example, functionalized filler or functionalized pigment, and the trifunctional silanes take place. Thus the coating composition remains liquid as long as it is protected from moisture. However, when the coating composition is exposed to water, e.g., when the coating composition is applied to the surface of a fluid-handling part and has contact with moisture in the air, further reaction can take place. For example, in the case of acetoxylated siloxane chains, the water is believed to react with the acetoxy groups to form acetic acid and replace the acetoxy group with a hydroxyl group. The hydroxyl groups on siloxane chains can then react with remaining acetoxy groups on the siloxane chains to release acetic acid and form bonds between siloxane chains. Similarly, bonds can be formed among other components of the composition, e.g., filler and pigment, which were functionalized, and the siloxane chains. There is no need for artificially-generated heat to be applied in order to effect cure. Because the trifunctional silanes used to form crosslinks have three functional sites to which a hydroxyl group on a siloxane chain can bond, a network of chains can form. In one embodiment, it is desirable for the siloxane chains to bond with filler or pigment through reaction of hydroxyl groups with functional groups, e.g., acetoxy groups. The filler or pigment particles can serve as additional crosslink sites, onto which many siloxane chains attach.

According to a hypothesis, the coatings have a viscoelastic nature and when a particle impacts the surface of the coating, the imposed stress temporarily deforms the coating and stretches the siloxane chains. In the process of deforming, the chains rub against each other; through friction, a portion of the energy of the impact is converted to thermal energy. This conversion to thermal energy through interchain friction accounts for the viscous nature of the coating. After the impact, the siloxane chains recoil. During the recoiling, the chains rub against each other so that the remainder of the energy imparted to the coating through the particle impact is converted to thermal energy. During the stretching and recoiling, the crosslinks act to preserve the topology of the linked siloxane chains in the coating so that the coating returns to its original shape prior to the particle impact. This chain recoiling accounts for the elastic nature of the coating. The processes of chain stretching, recoil, and interchain friction are also believed to be responsible for the conversion of vibrational energy, e.g., vibrational energy associated with a cavitation event to thermal energy. According to this hypothesis, the viscoelastic nature of the coatings promotes the ability of the coatings to resist the effects of and protect a substrate from the effects of particle impact, impingement, and cavitation.

The present invention includes the use of a coating composition formed from any trifunctional silane and silanol fluid. In one embodiment, specific components are selected to control the physical and chemical properties of the coatings formed. In this way, a composition is tailored to a specific application. For example, certain applications require a coating able to stop particles with high kinetic energy. It is believed that such applications sometimes call for the use of lower molecular weight silanol chains so that a high crosslink density is achieved. The large number of crosslinks per unit volume prevent too great a deformation of the material upon particle impact and allow the energy of a particle impact to be effectively distributed among a large number of chains to reduce the likelihood that one chain is stretched to the breaking point. Other applications require coatings which transmit very little vibration to the surface of the fluid-handling part or which require coatings to accommodate flexing of a fluid handling part. It is believed that such applications sometimes call for the use of higher molecular weight silanol chains so that a material of low crosslink density and low modulus is formed. Thus, it is thought to be possible to achieve an optimal balance between hardness and resiliency of a coating for an application by adjusting the molecular weight of the silanol chains.

In one embodiment, the coating compositions are applied directly to the surface of a fluid-handling part. In another embodiment, a primer, for example, an epoxy primer, is used for improved adhesion. An epoxy primer composition is applied to the surface of the fluid-handling part and allowed to partially or essentially fully cure to form a primer. The coating composition is then applied to the primer. In another embodiment, the primer composition includes an epoxy blend and an aliphatic amine. In a preferred embodiment, the epoxy blend includes epichlorohydrin and a bisphenol, e.g., Bisphenol-F; for example, EPON® Resin 862, manufactured by Resolution Performance Products LLC, is a suitable epoxy blend. An example of a suitable aliphatic amine is, for example, EPIKURE™ Curing Agent 3218, manufactured by Resolution Performance Products LLC. In another embodiment, the epoxy primer also includes a silane adhesion promoter. Examples of adhesion promoters are a trimethoxysilane, a triethoxysilane, or 3-glycidoxypropyltrimethoxysilane. The adhesion promoter is believed to enhance the chemical bonding of the silicone coating with the primer.

In another embodiment, the primer composition also includes other components, in order to, for example, control viscosity or otherwise facilitate application to the fluid-handling part. In a preferred embodiment, the primer composition includes a leveling agent, a solvent, and a pigment. An example of a suitable leveling agent is a modified urea formaldehyde in butanol; for example, CYMEL® U-216-8 resin manufactured by Cytec Industries Inc. A mixture of 2-ethoxyethanol and xylene is an example of a solvent.

Exemplary primer compositions include fractions of components in the ranges shown in Table 10.

TABLE 10

| Component | Fraction Range |
| --- | --- |
| Epoxy blend | about 20 to about 95 wt. % |
| Adhesion promoter | about 0.5 to about 10 wt. % |
| Aliphatic amine | about 1 to about 20 wt. % |
| Leveling agent, solvent, or pigment | about 0.01 to about 70 wt. % |

An example of a primer composition is provided in Table 11.

TABLE 11

| Component | Fraction |
| --- | --- |
| EPON ® Resin 862 | 26 wt. % |
| 3-glycidoxypropyltrimethoxysilane | 3.7 wt. % |
| EPIKURE ™ Curing Agent 3218 | 6.8 wt. % |
| CYMEL ® U-216-8 resin | 0.78 wt. % |
| 2-ethoxyethanol | 42 wt. % |
| Xylene | 13.2 wt. % |
| Pigment | 7.8 wt. % |

In one embodiment, before applying a primer to a surface of a fluid-handling part, the surface is prepared as follows. The surface is cleaned of all foreign matter such as dust, lint, oils, waxes, corrosion products, and water. The surface is prepared by grit blasting, which removes foreign matter and provides a mechanical profile, which promotes adhesion. Residual dust is removed with a blowgun. After grit blasting, the surface is preferably not wiped with a cloth or the like so as to avoid contaminating the surface with lint. The primer is preferably applied within eight hours of preparing the surface.

In one embodiment, the components of the primer composition are mixed and allowed to react for an induction period of from about 20 to about 30 minutes, before applying the primer composition to the surface of a fluid-handling part. Examples, of techniques for applying the primer composition to the fluid-handling part include spraying the primer composition onto the fluid-handling part, brushing or spreading the primer composition on the fluid-handling part, and dipping the fluid-handling part into the primer composition. In another embodiment, when the primer is applied by spraying, conventional spray equipment is used; the spray equipment is of the high-volume, low-pressure (HVLP) type. The cup pressure is set from about 10 to about 20 psi and the air pressure is set from about 30 to about 40 psi to produce good atomization.

After the primer composition is applied to the fluid-handling part, a period of time is allowed for the primer composition to cure to form the primer. In one embodiment, the primer is allowed to essentially fully cure. Curing of an epoxy primer may require eight hours or longer. In a preferred embodiment, the primer is allowed to cure overnight. In another embodiment, the primer is tested for adequate cure by rubbing with a solvent-soaked rag; when adequately cured, the primer's appearance is generally unaffected by the solvent and the rag generally does not pick up any of the primer's color. In another embodiment, the primer is applied to have a dry film thickness, i.e., a thickness after evaporation of solvent and after cure, of from about 20 µm to about 80 µm. It is believed that when the composition is applied over the primer, unreacted functional groups in the composition react with unreacted functional groups in the primer.

Techniques for applying the coating composition to a surface of a fluid-handling part include, for example, spraying the coating composition onto the surface, brushing or spreading the composition on the surface, and dipping the surface in the composition. In one embodiment, a thickness of the coating from which the solvent has evaporated and which has cured, i.e., a dry film thickness, of from about 200 to about 3000 µm, is obtained. In another embodiment, a total dry film thickness of from about 500 to about 1000 µm is obtained. In another embodiment, the coating composition is applied by spraying using HVLP equipment. The cup pressure is set from about 15 to about 30 psi and the air pressure is set from about 35 to about 50 psi. Dilution with additional xylene or mineral spirits may be required. In another embodiment, airless spray equipment is used. Pressures of from about 2000 to about 3300 psi can be used. More particularly, pressures of from about 3000 to about 3300 psi are used. The airless spray technique reduces the fraction of solvent required from that required for spraying with HVLP equipment.

In one embodiment, on horizontal surfaces, dry film thicknesses of less than about 200 µm are obtained through one transfer of coating composition to the surface. The term "transfer" is used to denote the deposition of a single layer of coating onto the surface of a fluid-handling part. For complex and vertical surfaces or to obtain a dry film thickness of greater than about 200 µm, the silicone composition is applied in multiple thin layers. The initial layer is usually applied at a dry film thickness of from about 70 to about 100 µm. The initial layer is allowed to dry completely and essentially fully cure through its full thickness. Essentially full cure often requires two to three hours. It is important to not apply a second layer too soon, because this may induce the first layer to lift, producing a blemish and detrimentally affecting adhesion. In another embodiment, a subsequent layer is applied with a dry film thicknesses of up to about 500 µm. In yet another embodiment, after this subsequent layer is inspected for lifting, additional subsequent layers are applied at hour intervals. The additional subsequent layers are applied with dry film thicknesses of up to about 500 µm. In a preferred embodiment, an initial layer with a dry film thickness of from about 70 µm to about 100 µm is sprayed onto the surface of the fluid-handling part. This initial layer is allowed to essentially fully cure. A subsequent layer is then sprayed onto the surface of the fluid handling part and allowed to cure to obtain a total dry film thickness of the coating ranging from about 200 to about 600 µm. In another embodiment, additional subsequent layers are sprayed onto the surface of the fluid handling part and allowed to cure to obtain a total dry film thickness of the coating ranging from about 200 to about 3000 µm.

An aspect of the invention is a method for maintaining protection of a fluid-handling part against erosion by particle impact, impingement, and cavitation. Although the erosion-resistant coating of the present invention itself is capable of withstanding the effects of erosion by particle impact, impingement, and cavitation for a prolonged time, the coating may eventually become worn after a long period of time. Furthermore, the coating is sometimes damaged through the impact of large, sharp objects or the mishandling of the coated fluid-handling part. An advantage of the present invention is that a freshly-applied coating generally exhibits good adhesion to a previously applied coating. In one embodiment, a damaged coating on a fluid-handling part is repaired by applying coating composition over the damaged coating and allowing the coating composition to dry and cure. In another embodiment, the damaged coating is stripped before applying and curing a new coating composition. In one embodiment, the damaged coating is removed by soaking a coated part in mineral spirits for a minimum of two hours, so that the coating swells, and then scraping the damaged coating off of the surface of the fluid-handling part. In a preferred embodiment, the damaged coating is removed by using a focused water jet to cut through the coating and lift the coating from the fluid-handling part. In another embodiment, the water jet is expelled at a pressure of about 2000 psi.

If the previous, damaged coating is applied over a primer, and the primer becomes exposed, then the old primer is preferably removed before a new coating composition is applied. Although a new coating adheres well to a previously applied coating, a new coating does not adhere as well to an old primer. The old primer is removed by grit blasting, and a new coating composition is directly applied to the surface of the fluid-handling part or a new primer composition applied to form a new primer before applying the new coating composition. In another embodiment, the old primer is lightly grit blasted to expose fresh primer surface, and a new primer composition is applied over the fresh primer surface.

Another aspect of the invention is repairing an erosion-resistant coating on a fluid-handling part. If an erosion-resistant coating suffers damage over only a small area, it may be more economical to repair the coating in this area than to apply a new coating to the entire surface of the fluid-handling part. In one embodiment, when damage extends only over a very small area, e.g., a hole of less than 6 mm diameter, and when the primer or the fluid-handling part is not exposed, the damaged area or hole is cleaned to remove foreign matter, new coating composition is applied, and the coating composition is allowed to cure. When the primer or the fluid-handling part is exposed, primer composition is applied and allowed to cure before applying the coating composition. In another embodiment, when damage extends over a larger area, e.g., a hole of greater than or equal to 6 mm diameter, any hole which penetrates into the fluid-handling part is preferably filled with mastic epoxy. The mastic epoxy is worked into the hole with a putty knife, leveled off to from about 0.5 to about 1 mm below the desired final surface, and allowed to cure. In a preferred embodiment, the epoxy mastic is selected to contain adhesion-promoting silanes so that once the epoxy mastic has cured, coating composition is applied directly to the surface of the epoxy mastic without the use of a primer. In another embodiment, primer composition is applied to cured epoxy mastic. After the primer composition dries and cures to form the primer, the coating composition is applied. When small areas of damage are repaired, the coating composition is prepared as a paste by not including solvent. In a first step, this paste is applied by using a calking gun, a putty knife, or a brush. In a second step, the coating composition paste is leveled with a putty knife. When larger areas of damage are repaired, the coating composition is preferably formulated with solvent and applied by spraying.

Another aspect of the invention is a method of using the erosion-resistant coating formed from the coating composition. The erosion-resistant coating is used to protect fluid-handling parts from the effects of erosion by particle impact, impingement, and cavitation. In one embodiment, the coating composition is applied to a fluid-handling part, and the coating composition is cured on the fluid-handling part to form an erosion-resistant-coating.

The term "fluid-handling part" denotes entire sets of equipment, e.g., hydro turbines, as well as components of equipment, e.g., turbine blades. In one embodiment, fluid-handling parts that convert a form of energy into fluid motion, e.g., propellers, and fluid-handling parts which convert fluid motion into another form of energy, e.g., turbines, are protected by the coating. In another embodiment, fluid-handling parts that control or guide the flow of fluid, e.g., wings, transmit energy to another component of a set of equipment, e.g., shafts, and shield other components from or store the fluid are protected by the coating.

In one embodiment, turbines, including hydro turbines and gas turbines, tide mills, windmills, compressors, pumps, and blowers are protected. In another embodiment, impellers, propellers, fans, runners, and wheels can be protected. In another embodiment, rings and stay rings are protected. In another embodiment, rotors, buckets, blades, including turbine blades, runner blades, fan blades, compressor blades, and propeller blades, vanes, and stay vanes are protected. In another embodiment, the coating protects helicopter rotors from erosion induced by impacting sand particles or water droplets. In another embodiment, hydroelectric turbines are protected from erosion induced by silt entrained in the water flowing through the turbine and erosion induced by cavitation. In another embodiment, marine propellers are protected from particle impact, impingement, and cavitation.

In another embodiment, housings, including jackets and shrouds, hubs, shafts, and flanges are protected. In another embodiment, the coating protects tanks, surge vessels, pipes, supply pipes, ducts, intake manifolds, channels, guides, tailraces, headraces, flumes, and draft tubes. For example, the coating protects air intake ducts or manifolds of combustion engines used in environments were the air is heavily laden with dust or sand, e.g., engines used in mining operations.

In another embodiment, apertures, eyes, nozzles, jets, and jet deflectors are protected. In another embodiment, valves, including check valves, ball valves, globe valves, pin valves, and gate valves, valve seats, gates, including wicket gates, wicket gate arms, wicket gate links, spear valves, and spear tips are protected. In another embodiment, penstocks, spiral cases, volutes, and strainers are protected. In another embodiment. cutwaters and bulkheads are protected by the coating.

In another embodiment, control surfaces, including balanced control surfaces and flight control surfaces, wings, slots, flaps, fuselages, and fairings are protected by the coating. In another embodiment, protruding parts, e.g., antennas and domes, are protected. The fluid-handling parts listed here are by way of example only; in other embodiment, the coating protects other fluid-handling parts. A fluid-handling part which has been coated with the erosion-resistant coating is termed an erosion-resistant fluid-handling part.

In one embodiment, the coating is used to protect surfaces of fluid-handling parts formed of various materials. For example, the coating protects surfaces of metal, ceramic, and polymer. In another embodiment, surfaces of steel alloy, stainless steel alloy, aluminum alloy, nickel alloy, titanium alloy, and lead alloy are protected. In a preferred embodiment, a hydroelectric turbine formed of a steel alloy or a stainless steel alloy is protected. In another embodiment, surfaces of urethane, epoxy, polycarbonate, acrylic, polyester composite, and epoxy composite are protected. The materials listed here are by way of example only; in other embodiments, the coating protects surfaces formed of other materials.

Because the coating is essentially unaffected by water, the coating is suitable for applications such as the protection of hydroelectric turbines and marine propellers. The coating exhibits good resistance to degradation by sunlight and water. The silicone coating is also resistant to degradation by elevated temperature; this resistance is required, for example, during extended exposure to sunlight in equatorial regions. The coating is therefore suitable for coating fluid-handling parts such as helicopter rotors, aircraft propellers, and turbojet fans on which the coating is exposed to the elements for extended periods of time.

The silicone coatings of the invention do not suffer the limitations of approaches known in the art to protect fluid handling parts such as helicopter rotors against erosion. For example, unless the energy of impact of a particle is very large, the silicone coatings do not suffer permanent deformation; by contrast, metal sheaths do suffer permanent deformation or chipping. The silicone coatings are believed not to transmit the vibration associated with particle impact to the fluid-handling part; by contrast, metal sheaths or metal coatings transmit vibration. The silicone coatings have long life; by contrast, polyurethane tape has a short service life which may be further reduced by the accumulation of particles, e.g., sand, under the tape, requiring replacement of the tape.

In addition to protecting a fluid-handling part from erosion by particle impact, impingement, and cavitation, silicone coatings according to the invention also provide a barrier which protects a fluid-handling part from potentially harmful environmental effects. In one embodiment, a silicone coating according to the invention includes a pigment agent which absorbs visible or ultraviolet light and thereby protects a fluid-handling part, e.g., the material which forms a helicopter rotor, from degradation by visible or ultraviolet light.

Use of the coatings to protect fluid-handling parts is economically favorable. The components of the composition have a low cost and the process of combining the components is simple and straightforward. In one embodiment, the fractions of components in the coating composition are adjusted so that the composition is suitable for any one of a range of application methods; these application methods include methods often associated with mass production, e.g., spraying, as well as methods often associated with one-off production, e.g., brushing or spreading. No special heat treatment is required to cure the composition; once applied to the fluid-handling part, the composition need only be exposed to the air; even the air in dry climates contains sufficient moisture to induce cure. As a result, costs associated with applying the compositions to a fluid-handling part are low. As discussed above, the silicone coatings have a long service life; elimination of the need for frequent replacement or repair of a fluid-handling part further reduces both material and labor costs in comparison with prior art protection methods.

EXAMPLE 1

Exemplary embodiments of coating compositions for protecting fluid-handling parts are presented in Table 12. Dow Corning 3-0134 Polymer, manufactured by Dow Corning Corp., was used for the silanol fluid; Dow Corning 3-0134 Polymer contains 400 ppm of hydroxyl groups and has a viscosity of 50,000 centistokes. Cabot TS-530, which is surface treated and is manufactured by Cabot Corp., was used for the fumed silica. A transition-metal ferrite spinel powder with a particle size less than 1 μm, F-6331-2 Black Ferro, manufactured by Ferro Corporation, was used as the pigment. Four different crosslinking agents were used for the set of compositions presented in Table 12. The chemical name of the crosslinking agent is in the row preceding the composition for which the crosslinking agent was used. Composition numbers 1–13 were formulated with ethyl triacetoxy silane; comp. no. 14 was formulated with vinyl triacetoxy silane; comp. no. 15 was formulated with methyl tris (methyl-ethyl-ketoximino) silane; and comp. no. 16 was formulated with vinyl tris (methyl-ethyl-ketomino) silane.

TABLE 12

| Comp. no. | Silanol wt. % | Fumed silica wt. % | Black Ferro pigment wt. % | Dibutyl tin dilaurate wt. % | Crosslinking agent wt. % |
| --- | --- | --- | --- | --- | --- |
| 1–13 | | | | | Ethyl triacetoxy silane |
| 1 | 87% | 8.3% | 0.39% | 0.11% | 4.6% |
| 2 | 87% | 8.3% | 0.39% | 0.11% | 2.8% |
| 3 | 87% | 8.3% | 0.39% | 0.11% | 3.7% |
| 4 | 87% | 8.3% | 0.39% | 0.11% | 5.4% |
| 5 | 83% | 8.1% | 0.38% | 0.11% | 7.2% |
| 6 | 83% | 7.9% | 0.38% | 0.11% | 8.9% |
| 7 | 91% | 4.9% | 0.40% | 0.11% | 4.9% |
| 8 | 83% | 10.4% | 0.38% | 0.11% | 4.5% |
| 9 | 83% | 12.6% | 0.38% | 0.11% | 4.5% |
| 10 | 79% | 15.2% | 0.35% | 0.10% | 4.2% |
| 11 | 78% | 18.0% | 0.35% | 0.10% | 4.1% |
| 12 | 79% | 7.5% | 0.35% | 0.10% | 13.5% |
| 13 | 78% | 7.3% | 0.35% | 0.10% | 16.3% |
| 14 | | | | | Vinyl triacetoxy silane |
| 14 | 87% | 8.3% | 0.39% | 0.11% | 4.6% |
| 15 | | | | | Methyl tris (methyl-ethyl-ketoximino) silane |
| 15 | 87% | 8.3% | 0.39% | 0.11% | 5.9% |
| 16 | | | | | Vinyl tris (methyl-ethyl-ketoximino) silane |
| 16 | 87% | 8.3% | 0.39% | 0.11% | 6.1% |

Table 13 presents data for erosion from particle-impact for cured coatings formed from each of the exemplary embodiments of coating compositions for which the composition data are shown in Table 12. The particle-impact erosion-rate data are presented in terms of micrograms of cured coating worn away per gram of grit blasted against the coating. The erosion-rate testing was performed with 120 grit particle size alumina blasted at a speed of 600 feet per second at an impact angle of 30 degrees with respect to the coating surface. Erosion-rate data for uncoated 1100 aluminum, uncoated 1008 mild steel, tungsten carbide, and nickel are also shown for comparative purposes; the erosion-rate data corresponds to the mass of metal which is worn away for these samples. The tungsten carbide is a high velocity oxy fuel (HVOF) sprayed coating including 17 wt. % cobalt.

Table 13 also presents data for the rate of loss of coating associated with cavitation. The cavitation loss-rate data are presented in terms of milligrams of cured coating worn away per hour of exposure to cavitation. The cavitation testing was performed with the coatings immersed in water and an ultrasonic horn vibrating at 20 kHz in the water 0.5 mm above the coating surface. Cavitation loss-rate data for uncoated 1100 aluminum and uncoated 1008 mild steel are also shown for comparative purposes; the cavitation loss-rate data corresponds to the mass of metal which is worn away for these samples.

TABLE 13

| Comp. no. | Crosslinking agent | Particle-impact erosion rate $\mu g_{surface}/g_{grit}$ | Cavitation loss-rate $mg_{surface}/hr$ |
|---|---|---|---|
| 1–13 | Ethyl triacetoxy silane | | |
| 1 | " | 4.2 | — |
| 2 | " | 4.3 | 2.3 |
| 3 | " | 4.3 | — |
| 4 | " | 4.6 | 2.1 |
| 5 | " | 4.7 | — |
| 6 | " | 5.2 | 2.5 |
| 7 | " | 3.6 | 2.7 |
| 8 | " | 5.4 | 2.4 |
| 9 | " | 6.4 | — |
| 10 | " | 7.4 | 3.6 |
| 11 | " | 5.6 | 2.4 |
| 12 | " | 5.1 | 1.7 |
| 13 | " | 5 | 2.4 |
| 14 | Vinyl triacetoxy silane | | |
| 14 | " | 4.6 | 3.5 |
| 15 | Methyl tris (methyl-ethyl-ketoximino) silane | | |
| 15 | " | 5.5 | 3.5 |
| 16 | Vinyl tris (methyl-ethyl-ketoximino) silane | | |
| 16 | " | 5.8 | 3.5 |
| Aluminum (1100) | — | 58.6 | 39 |
| Steel (1008) | — | 99.3 | 10 |
| Tungsten carbide | — | 69.9 | — |
| Nickel | — | 129.2 | — |

The greatest particle-impact erosion rate of a coating was observed for the cured coating formed from composition number 10, 7.4 $\mu g_{surface}/g_{grit}$. This particle-impact erosion rate is still only 13% of the particle-impact erosion rate of uncoated 1100 aluminum and is only 7% of the particle-impact erosion rate of uncoated 1008 mild steel. That is, the coatings exhibit much better erosion resistance than the two uncoated metals tested. The greatest cavitation loss-rate of a coating was observed for the cured coating formed from composition number 10, 3.6 $mg_{surface}/hr$. This cavitation loss-rate is only 9% of the cavitation loss-rate of uncoated 1100 aluminum and is only 36% of the cavitation loss-rate of uncoated 1008 mild steel.

EXAMPLE 2

Several examples of coating composition are presented in Table 14.

TABLE 14

| Comp. | Silanol wt. % | Fumed silica wt. % | Black Ferro pigment wt. % | Dibutyl tin dilaurate wt. % | Ethyl triacetoxy silane wt. % |
|---|---|---|---|---|---|
| A | 40 | 0.01 | 0.01 | 0.01 | 0.01 |
| B | 99 | 25 | 10 | 5 | 20 |
| C | 60 | 3 | 0.02 | 0.02 | 1.5 |
| D | 95 | 13 | 5 | 1 | 10 |
| E | 85 | 5 | 0.03 | 0.04 | 2 |
| F | 92 | 10 | 1 | 0.4 | 7 |

When coating compositions C, D, E, or F are applied to and cured on a fluid-handling part, the particle-impact erosion rate of the resultant coating is expected to be similar to the erosion rates for coatings from compositions 1–16, presented in Table 13, under similar conditions of blasting with 120 grit size alumina at a speed of 600 ft/s and an impact angle of 30 degrees. The cavitation loss rate of coatings formed from compositions C, D, E, or F is expected to be similar to the cavitation loss rates for coatings from compositions 1–16, presented in Table 13, under similar conditions of sonication with the coatings immersed in water and an ultrasonic horn vibrating at 20 kHz in the water 0.5 mm above the coating surface. Coating compositions A and B have different weight percentages of components than compositions 1–16, as presented in Table 12. The particle-impact erosion rate and cavitation loss rate for coatings formed from compositions A and B may differ from the results for coatings formed from compositions 1–16, presented in Table 13. However, the compositions A and B, when cured on a fluid-handling part, are expected to result in useful coatings which provide effective protection of the fluid handling part against erosion by particle impact, impingement, and cavitation.

Use of a pigment other than Black Ferro F-6331-2 in a coating composition is expected to, upon curing, result in a coating with properties, e.g., erosion-resistance and protection of a fluid-handling part from erosion by particle impact, impingement, and cavitation, similar to that of a coating from a composition in which Black Ferro F-6331-2 is used. Use of a tin catalyst, and one of many other catalysts not based on tin, other than dibutyl tin dilaurate and use of a crosslinking agent other than ethyl triacetoxy silane, for example, vinyl triacetoxy silane, methyl tris (methyl-ethyl-ketoximino) silane, or vinyl tris (methyl-ethyl-ketoximino) silane, is expected to, upon curing, result in a coating with properties, e.g., erosion-resistance and protection of a fluid-handling part from erosion by particle impact, impingement, and cavitation, similar to that of a coating from a composition in which dibutyl tin dilaurate and ethyl triacetoxy silane are used.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. An erosion-resistant fluid-handling part comprising:
   a fluid-handling part;
   a coating composition disposed on the fluid-handling part at a dry film thickness greater than about 200 μm, wherein the coating composition comprises:
   a trifunctional silane ranging from about 0.01% by weight to about 20% by weight of the coating composition;
   a silanol fluid having a weight average molecular weight of at least 4000 g/mol and wherein the silanol fluid ranges from about 40% by weight to about 99% by weight of the coating composition; and
   fumed silica ranging from about 0.01% by weight to about 25% by weight of the coating composition.

2. An erosion-resistant fluid handling part according to claim 1, wherein the coating composition has a dry film thickness ranging from about 200 μm to about 3000 μm.

3. An erosion-resistant fluid-handling part according to claim 1, wherein the silanol fluid has a weight average molecular weight ranging from about 4000 g/mol to about 150,000 g/mol.

4. An erosion-resistant fluid-handling part according to claim 1, wherein the coated fluid-handling part has a particle-impact erosion rate less than about 13% of the particle-impact erosion rate of uncoated 1100 aluminum.

5. An erosion-resistant fluid-handling part according to claim 1, further comprising a primer composition disposed on the fluid handling part.

6. An erosion-resistant fluid-handling part according to claim 5, wherein the primer composition is an epoxy primer composition comprising an epoxy blend, an aliphatic amine, and a silane adhesion promoter.

7. An erosion-resistant fluid-handling part according to claim 6, wherein the silane adhesion promoter is selected from the group consisting of: a trimethoxysilane, a triethyoxysilane, and 3-glycidoxypropyl trimethoxysilane.

8. An erosion-resistant fluid-handling part according to claim 1, wherein the fluid-handling part is selected from the group consisting of: hydro turbines, gas turbines, tide mills, windmills, compressors, pumps, blower, impellers, propellers, fans, runners, wheels, rings, stay rings, rotors, buckets, blades, turbine blades, runner blades, fan blades, compressor blades, propeller blades, vanes, stay vanes, helicopter rotors, hydroelectric turbines, marine propellers, housings, jackets, shrouds, hubs, shafts, flanges, tanks, surge vessel; pipes, supply pipes, ducts, intake manifolds, channels, guides, tailraces, headraces, flumes, draft tubes, air intake ducts, combustion engine manifolds, apertures, eyes, nozzles, jets, jet deflectors, valves, check valves, ball valves, globe valves, pin valves, gate valves, valve seats, gates, wicket gates, wicket gate arms, wicket gate links, spear valves, spear tips, penstocks, spiral cases, volutes, strainers, cutwaters, bulkheads, control surfaces, balanced control surfaces, flight control surfaces, wings, slots, flaps, fuselages, fairings, antennae, and domes.

9. An erosion-resistant fluid-handling part according to claim 8, wherein the fluid-handling part is a hydroelectric turbine.

10. An erosion-resistant fluid-handling part according to claim 1, wherein the fluid-handling part has a first erosion-resistant coating disposed thereon and wherein a second erosion-resistant coating is disposed on the first erosion-resistant coating.

11. An erosion-resistant fluid-handling part comprising:

hydroelectric turbine;

an epoxy primer composition disposed on the hydroelectric turbine, the epoxy primer composition comprising an epoxy blend, an aliphatic amine, and a silane adhesion promoter;

a coating composition disposed on the epoxy primer composition at a dry film thickness ranging from about 200 µm to about 3000 µm, wherein the coating composition comprises:

a trifunctional silane ranging from about 0.01% by weight to about 20% by weight of the coating composition;

a silanol fluid having a weight average molecular weight ranging from about 4000 g/mol to about 150,000 g/mol and wherein the silanol fluid ranges from about 40% by weight to about 99% by weight of the coating composition; and fumed silica ranging from about 0.01% by weight to about 25% by weight of the coating composition.

12. An erosion-resistant fluid-handling part according to claim 11, wherein the coated hydroelectric turbine has a particle-impact erosion rate less tban about 13% of the particle-impact erosion rate of uncoated 1100 aluminum.

* * * * *